United States Patent
Spihlman et al.

(10) Patent No.: US 10,837,172 B1
(45) Date of Patent: Nov. 17, 2020

(54) TAPERED KERF CONSTRUCTION

(71) Applicant: USG Interiors, LLC, Chicago, IL (US)

(72) Inventors: Michael P. Spihlman, Valparaiso, IN (US); Peder J. Gulbrandsen, Aurora, IL (US); Samuel D. Hulka, Mount Prospect, IL (US)

(73) Assignee: USG INTERIORS, LLC, Chicago, IL (US)

( * ) Notice: Subject to any disclaimer, the term of this patent is extended or adjusted under 35 U.S.C. 154(b) by 0 days.

(21) Appl. No.: 16/566,909

(22) Filed: Sep. 11, 2019

(51) Int. Cl.
| | |
|---|---|
| *B32B 3/06* | (2006.01) |
| *E04C 2/04* | (2006.01) |
| *B32B 13/08* | (2006.01) |
| *B32B 37/12* | (2006.01) |
| *B32B 7/12* | (2006.01) |

(52) U.S. Cl.
CPC ............. *E04C 2/043* (2013.01); *B32B 3/06* (2013.01); *B32B 7/12* (2013.01); *B32B 13/08* (2013.01); *B32B 37/12* (2013.01); *B32B 2419/00* (2013.01); *Y10T 428/24488* (2015.01); *Y10T 428/24777* (2015.01); *Y10T 428/24793* (2015.01)

(58) Field of Classification Search
CPC ...... Y10T 428/24488; Y10T 428/24793; Y10T 428/24777; B32B 3/06; E04C 2002/004; B28B 11/003; B28B 11/0863
See application file for complete search history.

(56) References Cited

U.S. PATENT DOCUMENTS

| | | | |
|---|---|---|---|
| 4,584,224 A | 4/1986 | Schneller | |
| 8,684,134 B2 | 4/2014 | Dugan et al. | |
| 8,770,345 B2 | 7/2014 | Dugan et al. | |
| 8,925,677 B2 | 1/2015 | Dugan et al. | |
| 9,187,907 B2 * | 11/2015 | Schraga | E04B 2/723 |

* cited by examiner

*Primary Examiner* — Alexander S Thomas
(74) *Attorney, Agent, or Firm* — Pearne & Gordon LLP

(57) ABSTRACT

A drywall sheet with a gypsum core sheathed in front and rear paper layers, an edge of the sheet being tapered towards the rear, the taper being formed by a flap of a marginal area of the front paper and a thin layer of gypsum attached to an inner side of the front paper margin being folded into a space resulting from a slot cut in the sheet edge to a depth generally equal to the width of the flap, the flap being held in place by a continuous layer of a hot melt adhesive occupying a space of the slot not occupied by the flap and having an elasticity that imparts fastener penetration resistance to the associated edge from a front face of the sheet.

6 Claims, 1 Drawing Sheet

TAPERED KERF CONSTRUCTION

BACKGROUND OF THE INVENTION

The invention relates to improvements in drywall sheets or panels, in particular, to such sheets that facilitate the finishing of end joints with like sheets.

PRIOR ART

Conventional drywall sheets are manufactured as rectangular panels with their long edges tapered to facilitate flush taped joints. The long edges are typically aligned with a manufacturing process line making the taper easy to form. Short edges are not as readily tapered and, accordingly, most drywall products have plain or non-tapered ends sometimes called square ends.

Drywall sheets, also known as gypsum boards, have been produced on a limited scale with tapered short ends. Various techniques have been employed either during the gypsum sheet casting process or after a sheet has rigidified and has been cut to length. An example of the latter is disclosed in U.S. Pat. No. 4,584,224.

Acoustical drywall sheets perforated and clad with a porous scrim are known, for example, from U.S. Pat. Nos. 8,684,134, 8,770,345, and 8,925,677. These acoustical sheets after installation are preferably coated with a relatively smooth acoustically transparent paint. This paint or coating has negligible surface hiding properties so that uneven joints between panels or sheets can be conspicuous, especially at conventional non-tapered butt joints.

Acoustical, perforated drywall sheets present an additional problem where sheet edges are not tapered. Application of joint compound over a wide pattern to conceal the joint tape on abutted flat sheet edges, a regular technique with conventional drywall, would be detrimental to the sound absorbing function since a proportionate fraction of the acoustical holes would be blocked and their function lost.

SUMMARY OF THE INVENTION

The invention provides a drywall sheet with its long edges being conventionally tapered and its short edges being modified into a taper in a manner that improves the serviceability of the sheet. The modified short edges of the inventive drywall sheet are kerfed or slotted, supplied with an adhesive in the kerf and displaced into a permanent taper.

The adhesive is a hot-melt product that surprisingly improves the serviceability of the modified edge by increasing its hardness, resilience and elongation characteristics, making the edges more durable as compared to conventionally tapered edges for handling, shipping and installation.

In the preferred form, the drywall sheet has a conventional gypsum core sheathed in front and back papers that are through perforated with a multiple of small holes and covered on its room facing side with a porous non-woven fiberglass scrim or veil, and on its rear face a non-woven fabric. The scrim is adhesively attached to the perforated paper face of the drywall sheet and facilitates the inventive tapered edge production by reinforcing the attachment of a flap formed in the kerfing operation, folded up for application of a hot-melt adhesive and then folded down to form the desired taper.

The adhesive application is metered so that the space under the folded down flap is preferably slightly underfilled to reduce hydraulic forces that could otherwise rupture at the flap connection or otherwise escape from the intended space.

DESCRIPTION OF THE PREFERRED EMBODIMENTS

Figure 1:
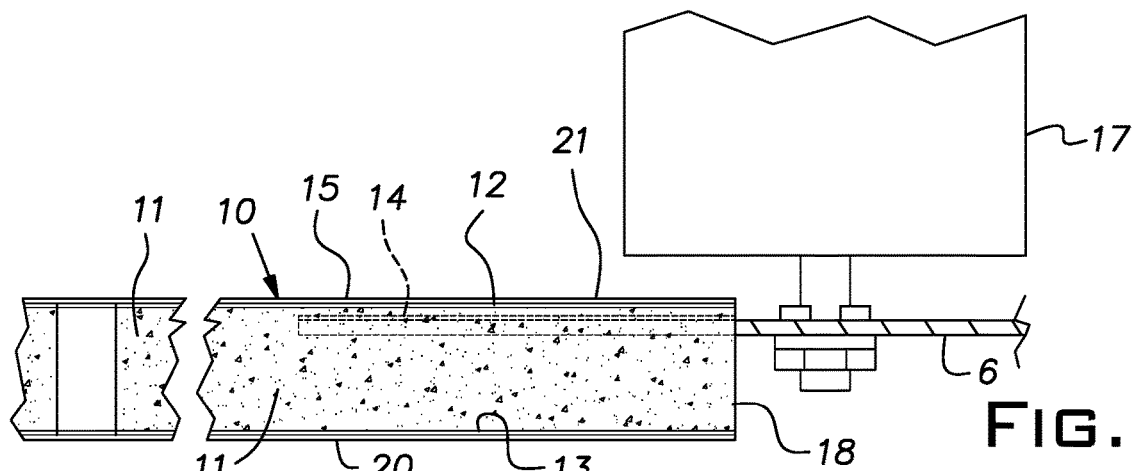
FIG. 1 is a somewhat diagrammatic cross-sectional view of an original non-tapered or square end of a drywall sheet and a circular sawblade and motor for slotting the end.

FIG. 1 illustrates a non-tapered end of a drywall sheet 10. As is conventional, the sheet 10 is manufactured with rectangular faces and having a gypsum core 11 sheathed in and bonded to front and rear paper layers 12, 13. Long edges of the rectangular sheet 10 are tapered, as is customary in the industry. The manufactured or factory long edge taper is accomplished by reducing the thickness of the continuum of gypsum in the margins of the core 11. Typically, the sheet or panel 10 has major dimensions of 4 foot by 8 foot, 10 foot or 12 foot. In the illustrated example, the sheet 10 is nominally $5/8$ inch thick and is of an acoustical construction such as disclosed in aforementioned in U.S. Pat. Nos. 8,684,134, 8,770,345 and 8,925,677. The sheet 10, including the paper cladding 12, 13, is through perforated with circular holes of, for example, a diameter of 0.312 inches (8 mm) with a total open area of between about 12% and 20%. A perimeter of the sheet 10, for example, a zone of $5\frac{1}{2}$ inch wide is non-perforated. A front face or room side of the sheet is preferably covered to or near its four edges with an adhesively attached porous non-woven glass fiber veil or scrim such as used in the ceiling panel industry, and a rear face of the sheet 10 is preferably covered to or near its four edges with an adhesively attached non-woven glass fiber veil or fabric used in the ceiling panel industry.

As is common, the sheet 10 is originally manufactured with short edges, e.g. those measuring 4 foot, for example, being square or non-tapered. The invention provides a method, and a resulting product, by which the non-tapered edges are converted into tapered edges.

Referring to FIG. 1, the original tapers on the long edges at the front face of the sheet 10 are indicated at the upper broken line 14. A circular sawblade or cutter 16 is driven in rotation by an electric motor 17. The blade 16 is in a plane parallel to the plane of the sheet 10 and spaced from the sheet front face a distance sufficient to preferably be below the broken line 14 where the tapers at the long edges of the sheet are at a minimum thickness.

Figure 2:
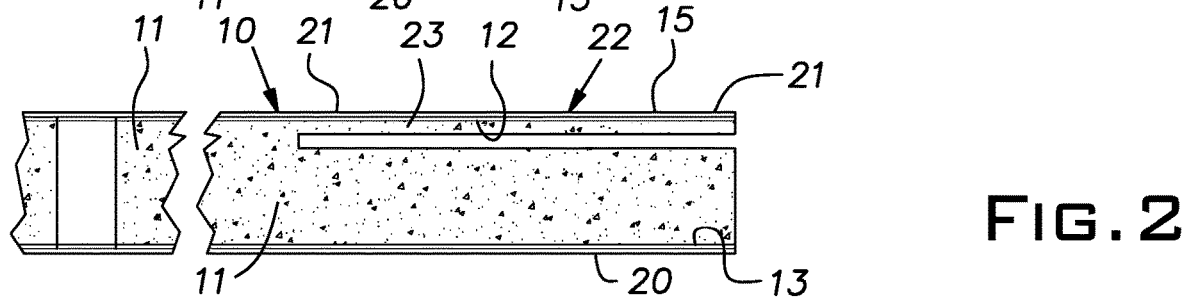
FIG. 2 is a view, similar to FIG. 1, of a sheet end after being slotted.

While rotating, the blade 16 and motor 17 are driven by a mechanism (not shown) in a path parallel to and along the original non-tapered sheet edge 18 to form a kerf or deep slot 19 in this edge as shown in FIG. 2. By way of example, the slot or kerf 19, which in the illustrated example lies parallel to the plane of the sheet 10, is spaced about 0.080 inches from the front face, designated 21, of the sheet 10, has a depth of about $2\frac{3}{4}$ inches and a width of about 0.090 inches ideally corresponding to the width of the teeth of the blade 16. A strong vacuum is preferably applied to the cutting area of the blade 16 to evacuate as much gypsum dust as practical. If desired, the original edge 18 can be machined or faced with a suitable tool such as a rotary sawblade prior to operation of the kerf cutting blade 16.

Figure 3:
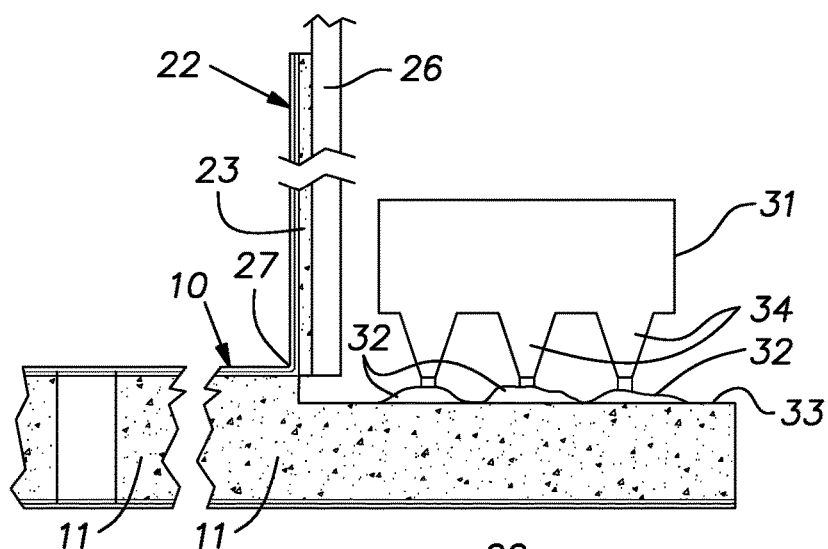
FIG. 3 is a view of the drywall sheet end with a flap displaced by folding to allow a deposit of hot melt adhesive from a dispenser into the slotted zone.
Figure 4:
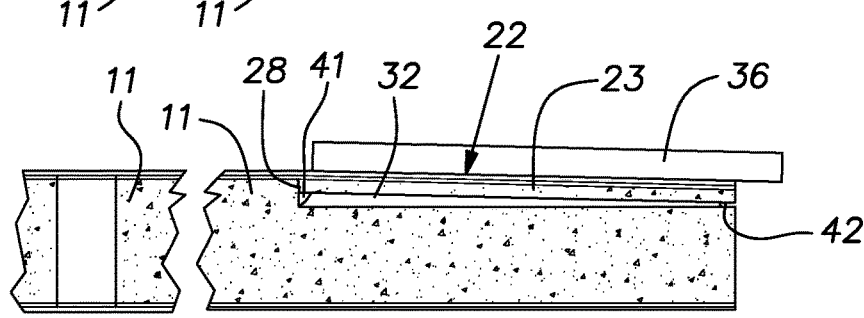
FIG. 4 is a view with the flap folded to form a tapered edge.

A flap 22 comprising a thin layer 23 of gypsum material from the core 11 and coextensive areas of the front paper 12 and scrim 15 resulting from the kerf 19 is folded up or away from the sheet 10 preferably by an automatically operated plate 26 that enters the kerf and then rotates the flap about a hinge or fold line 27 associated with the front paper 12 and scrim 15 near the base or bottom of the kerf 19. The paper 12 and scrim 15 work as a "living hinge" during folding motion of the flap 22. The gypsum flap material 23 is preferably of sufficient thickness, with the reinforcement provided by the paper 12 and scrim 15 to remain intact and be reliably folded open (FIG. 3) and closed (FIG. 4). The gypsum 23 of the flap 22 fractures along a line 28 at the base of the kerf or slot 19 from the main body of the gypsum core 11. Any tendency of the face paper 12 to tear or otherwise fail is resisted by the non-woven veil or scrim 15 adhered to it.

With the flap 22 maintained away from the original zone of the slot 19 by the plate 26, an automatically operated dispenser 31 travels along the sheet edge 18 to deposit quantities of a hot melt adhesive 32 on a side 33 of the original slot 19. The dispenser 31, heated to the adhesive working temperature can include multiple orifices or nozzles 34. The nozzles 34 apply an accurately measured volume of adhesive 32 in continuous bead form onto the slot side 33.

With the adhesive 32 dispensed on the open slot side 33, the flap 22 is automatically rotated about the fold or hinge line 27 towards the slot side 33 by a flat platen until the distal end of the flap contacts the outer end of the slot side 33 or is closely adjacent. The platen 36 holds the flap 22 in this position until the adhesive sticking to the gypsum forming the slot side 33 and gypsum layer 23, cools and sets thereby fixing the flap 22 in a tapered position.

Preferably the dispensed volume of adhesive 32 is slightly less than the volume or space bounded by the slot side 33 and flap 22 when the flap is pressed to its tapered position. This ensures that the adhesive will leave small void areas 41, 42 near the bottom of the slot 19 and adjacent an outer end of the slot.

The adhesive bead or beads are of sufficient diameter or cross-section that they are first contacted by the flap gypsum layer 23 and then laterally displaced by this layer. The adhesive bead or beads is or are continuous along the full length of the slot 19 but for, preferably, a slight shortfall at both ends of the slot.

The slotting, flap controlling, and adhesive dispensing equipment can be duplicated to process both ends of the sheet 10 simultaneously.

An example of a suitable hot melt adhesive is of the EVA copolymer type having an optimal running temperature of 350 degrees F. and a softening point of 108 degrees C. This adhesive 32 is characterized by a degree of elasticity at room temperature.

The adhesive 32 in the collapsed slot forms a continuous film or layer itself and an integrated composite structure with adherence to the gypsum 11 on both sides of the adhesive. The tapered sheet edge made by the inwardly or rearwardly folded flap 22, the adhesive 32 and residual of the gypsum core 11 rearward of the slot 19 has demonstrated the surprising result of improved fastener penetration resistance. Compared to fastener penetration resistance exhibited by conventional tapered edges on long edges of a sheet 10, the adhesive composite edge in bench tests resists penetration of a fastener profile, after peak load, for a distance of about 0.020 inch compared to the penetration resistance of a conventional tapered edge on a long sheet edge of a distance of about 0.017 inch. This 18% improved penetration resistance on the inventive tapered adhesive containing sheet edges is particularly beneficial when the edge is attached to a joist or hanger shared with another sheet end. In this circumstance, a screw or nail fastener may be cocked towards the joist or hanger center line particularly when the sheet edge falls short of being precisely on center with the joist or hanger. Still further, the increased hardness, measured at a 50% increase, and the flexibility of the hot melt adhesive improves the durability of the sheet edge in resisting impacts during handling, shipping and installation of a sheet.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A drywall sheet with a gypsum core sheathed in front and rear paper layers, an edge of the sheet being tapered from a front towards a rear of the sheet, the taper being formed by a flap of a marginal area of the front paper and a thin layer of gypsum attached to an inner side of the front paper margin being folded into a space resulting from a slot cut in the sheet edge to a depth generally equal to the width of the flap, the flap being held in place by a continuous layer of a hot melt adhesive occupying at least a major portion of the space of the slot not occupied by the flap and having an elasticity that imparts fastener penetration resistance to the associated edge from a front face of the sheet of a distance greater than a penetration resistance of conventionally tapered edge of the sheet formed by gradual reduction in the thickness of continuous gypsum core material towards the respective sheet edge terminus.

2. A drywall sheet as set forth in claim 1, wherein the sheet is through perforated with a multitude of holes and is clad with a non-woven fiberglass scrim on the front paper and a non-woven fabric on the rear paper.

3. A drywall sheet as set forth in claim 1, wherein the adhesive volume is less than the volume of the slot not occupied by the flap whereby excessive hydraulic force in the adhesive during final positioning of the flap is avoided.

4. A drywall sheet as set forth in claim 1, wherein the gypsum of the flap has a fracture line at a base of the slot resulting from the flap being folded away from the original slot space.

5. A method of tapering a square end of a drywall sheet having a paper sheathed gypsum core comprising cutting a deep kerf in an edge terminus parallel to and spaced from a front face of the sheet so that gypsum core material and a front paper facer form a flap at a front side of the slot, folding the flap so that it hinges with the front paper facer about a line adjacent a base of the slot and the gypsum of the flap is fractured from the gypsum core adjacent the hinge line, with the flap folded from an original position adjacent the slot while it remains attached to the sheet by the front paper layer at the hinge line applying molten hot melt adhesive along a remaining side of the slot and folding the flap into the space of the original slot and into contact with the adhesive in a manner that ensures the adhesive forms a continuous layer occupying the majority of space between the flap and the core and holding the flap in a final position until the hot melt adhesive is set by cooling.

6. A method as set forth in claim 5, wherein the adhesive is deposited as a molten bead having a cross-section that interferes with closing flap movement so as to ensure that the adhesive is contacted by the flap and forced laterally of the bead over both the slot side and flap.

\* \* \* \* \*